United States Patent [19]

Ferguson, Jr.

[11] Patent Number: 5,147,980
[45] Date of Patent: Sep. 15, 1992

[54] SWIMMING POOL FLUSH MOUNT JUNCTION BOX

[76] Inventor: Robert A. Ferguson, Jr., 1973 Briarwood St., Dunedin, Fla. 34698

[21] Appl. No.: 657,491

[22] Filed: Feb. 19, 1991

[51] Int. Cl.$^5$ .............................................. H02G 3/12
[52] U.S. Cl. ........................................ 174/37; 174/48; 174/51
[58] Field of Search ................... 174/37, 48, 51, 65 R

[56] References Cited

U.S. PATENT DOCUMENTS

| | | | |
|---|---|---|---|
| 1,923,939 | 8/1933 | Lavarack | 174/65 R X |
| 2,827,914 | 3/1958 | Alters | 220/3.7 X |
| 3,634,598 | 1/1972 | Stanfield | 174/51 |
| 3,672,103 | 6/1972 | Kost | 174/37 X |

Primary Examiner—Leo P. Picard
Assistant Examiner—D. A. Tone
Attorney, Agent, or Firm—Notaro & Michalos

[57] ABSTRACT

A junction box for flush mounting around a swimming pool, to connect electrical fixtures of the swimming pool, comprises a one piece plastic housing having a side wall defining an inner cylindrical chamber having an upper opening and a bottom wall. A pair of downwardly extending projections each carry an axial bore for leading wires into the chamber. A pair of blocks at diametrically opposed positions in the chamber carry a brass grounding bar to which bonding wires may be connected using screws. A potting compound substantially fills the chamber before the chamber is closed by a threaded lid which, when seated on the housing, lies flush with the deck of a swimming pool.

20 Claims, 2 Drawing Sheets

SWIMMING POOL FLUSH MOUNT JUNCTION BOX

FIELD AND BACKGROUND OF THE INVENTION

The present invention relates in general to junction boxes for connecting electrical fixtures such as lights, to power, ground and switch cables, and in particular to a new and useful junction box for use in connecting swimming pool lights and other fixtures in like environments.

Several states have strict regulations on the construction, positioning and manner of connection of electrical fixtures in and around swimming pools, hot tubs, fountains and the like where a serious potential for electrocution exists. Such regulations are particularly strict in states having generally warm weather where swimming pools are widely utilized, such as Florida.

These regulations among other things, require so-called "bonding" which is the electrical connection of all metal fixtures and housings to each other and to ground by wires. This eliminates floating potentials and reduces the chance of electrocution which may occur at the various metal parts. The wires used for bonding are for example with a solid, copper conductor, insulated, covered, or bare, not smaller than No. 8.

These regulations also require all connections between fixtures, bonding wires, power wires and switching wires, to be established in approved junction boxes which are commonly referred to as J-boxes. These junction boxes must be placed at minimum distances from the edge of the swimming pool or other water facility.

All J-boxes which currently satisfy strict state requirements, are mounted above the surface of the ground and are made of metal. Some flush mounted J-boxes made of brass and other metal are known but these do not satisfy the strict requirements. It has also been found that these boxes, which were usually installed more than 15 years ago before the current stricter requirements, are subject to corrosion. Many of these boxes develop sharp edges and represent a hazardous condition in the swimming pool deck where they are mounted. The covers must often be chiseled free of the box for maintenance or replacement. Flush mounted boxes are safer, however, since they do not protrude from the deck and thus do not pose a tripping hazard.

While currently, the pertinent regulations in Florida technically permit flush mounted boxes, no J-box meeting the strict requirements for flush mounting are now known or available In addition, connection cords which are approved for swimming pool use, generally come in standard lengths of 15 or 30 feet. Since no splices or connections are permitted except in an approved junction box, an electrical contractor installing lights, pumps, heaters and other electrical fixtures in and around swimming pools, are limited as to where a junction box can be placed. Since only above the ground junction boxes are currently available for use in manners which meet the strict state regulations, a contractor must often place an above the ground J-box in an inconvenient location, many times in moist soil, around the swimming pool deck. Efforts are made to conceal the boxes using vegetation and other decorative measures which only add to the cost of the swimming pool installation.

SUMMARY OF THE INVENTION

An object of the present invention is to provide a J-box which meets state regulations, particularly the strict regulations of Florida, and which is flush mounted so that it can be positioned the minimum allowable distance from the edge of the swimming pool, directly in the deck of the swimming pool.

The J-box of the present invention is made predominantly of rugged approved plastic material and has a non-skid top for safety. The use of plastic materials avoids corrosion and material break-down which plagues brass and metal boxes, in the water environment around the swimming pool which is further aggravated by the presence of specialized swimming pool chemicals which are corrosive, such as chlorine compounds and pH equalizers.

A further object of the present invention is to provide a flush mount swimming pool junction box which has no exposed metal parts and which is easy to open, despite years of service.

By utilizing the J-box of the present invention, a contractor can order a single length of swimming pool light cord, for example the standard 15 feet length, since placement of the J-box is never a problem.

Accordingly, a still further object of the present invention is to provide a junction box for connecting electrical fixtures of swimming pools and the like, comprising: a plastic, non-corrosive housing having a side wall defining an interior chamber with an upper opening, a bottom wall connected to the side wall from closing a bottom of the chamber and a pair of spaced apart projections extending downwardly from the bottom wall, each projection having an axial bore therein extending through the bottom wall into the chamber for the passage of conductors into the chamber through the projections; means defining at least one grounding bar seat in the chamber positioned between the bottom wall and the upper opening; an electrically conductive grounding bar connected to the at least one seat for fixing the grounding bar in the chamber; a plastic, non-corrosive lid detachably connected to the housing at the upper opening; and a water tight seal between the lid and the housing for sealing the upper opening when the lid is engaged to the housing.

A further object of the present invention is to provide a junction box which is particularly useful for connecting wet-niche light fixtures in the wall of swimming pools, to bonding wires, power wires and switch wires for servicing and protecting the fixture.

A still further object of the present invention is to provide a junction box which is non-corrosive, adapted to be flush mounted in the deck around a swimming pool, simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
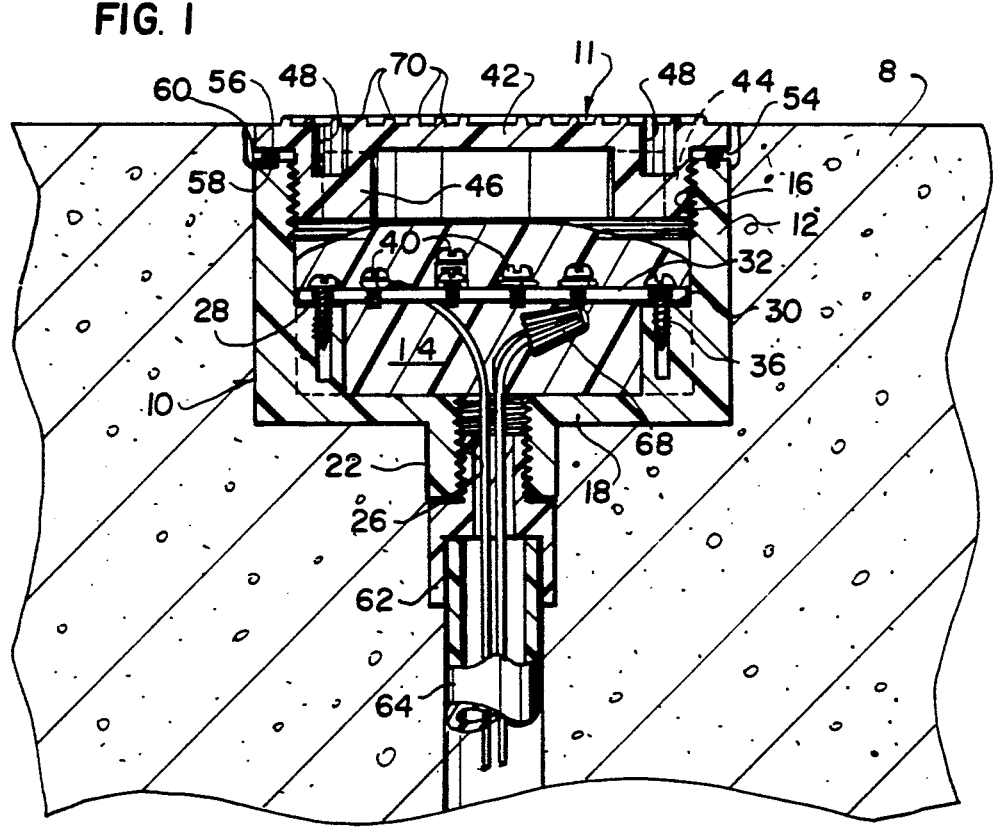
FIG. 1 is a sectional view of the flush mount swimming pool junction box according to the present invention.

Referring to the drawings in particular, the invention embodied therein comprises a non-corrosive flush mount junction box for flush mounting in a swimming pool deck 8, and having a housing generally designated 10 in FIG. 1 which is made of a single piece of non-corrosive plastic material such as polyvinyl chloride and having a cylindrical side wall 12 defining an interior chamber 14 where electrical connections are to be made. Chamber 14 has an open upper end 16 which is internally threaded to receive the external threads of a lid generally designated 11 made of the same material as housing 10.

Figure 3:
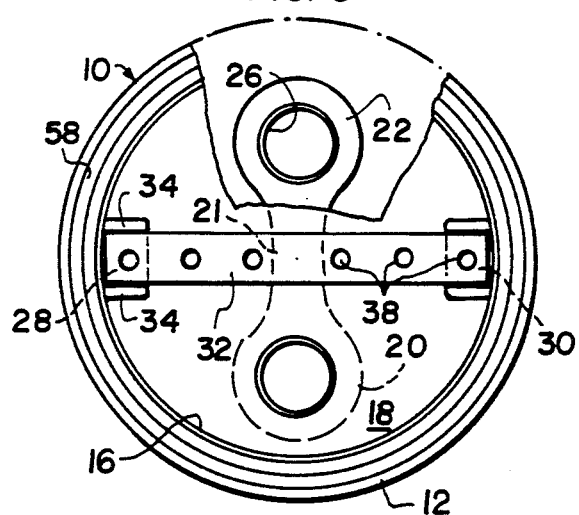
FIG. 3 is a top plan view of the box housing, with portions cut away.
Figure 4:
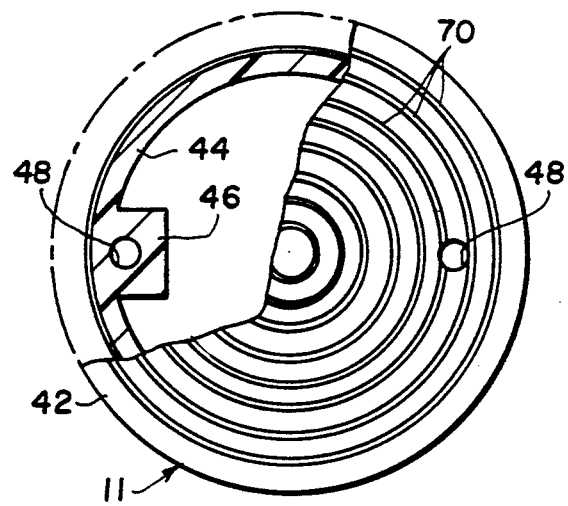
FIG. 4 is a top plan view of the lid, with portions cut away.
Figure 2:
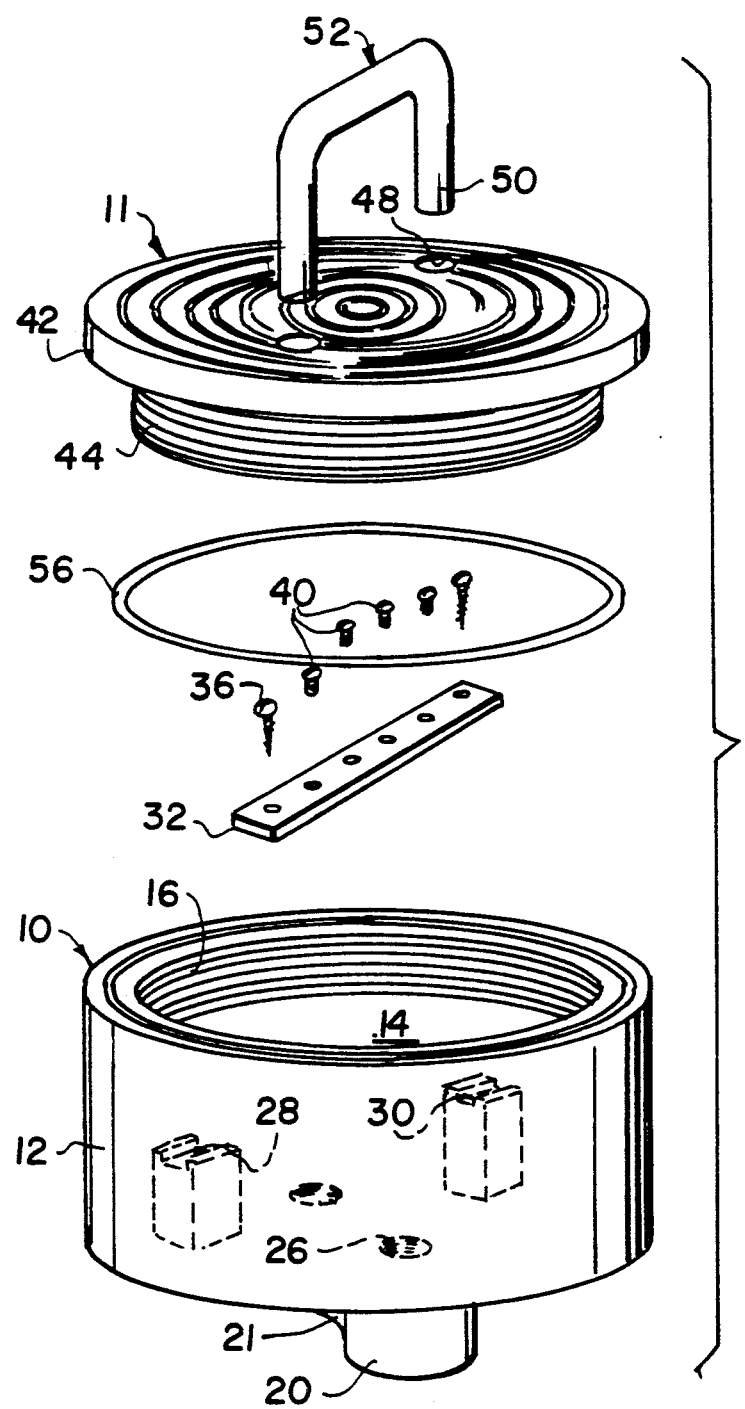
FIG. 2 is an exploded perspective view thereof.

The bottom of chamber 14 is closed by a bottom wall 18. A pair of spaced apart projections 20 and 22 extend downwardly from bottom wall 18 as best shown in FIGS. 2 and 3. Each projection contains an axial bore 26 which is internally threaded and which extends through the bottom wall 18 into the chamber 14. The bore of each projection is meant to receive various conductors, for example, insulated copper wires. These conductors include bonding wires which connect all metal fixtures and parts of the swimming pool to a common potential. For strength a subdiameter web 21 interconnects the projections.

Means are provided in the housing which define a pair of grounding bar seats 28 and 30 for receiving an electrically conductive, preferably, brass grounding bar 32 at an intermediate location in chamber 14 between the bottom wall 18 and the upper opening 16. As best shown in FIG. 3, each seat is formed by a block of plastic material formed as one piece with the sidewall, bottom wall and projection, having an upper surface carrying the seat with opposite ears 34 for laterally holding the bar 32 which extends across the chamber and rests on the seats. Self tapping screws 36 are utilized in holes in the blocks and through end holes in the bar to fix the bar to the housing. The bar includes four additional threaded holes that receive machine screws 40 used to connect the wires, with or without conventional tabs or other connectors, to the grounding bar 32 as shown in FIG. 1.

Lid 11 comprises a disc-shaped top plate 42 having a lower surface from which an annular threaded rim 44 extends. At opposed locations around rim 44, a pair of blocks 46 are provided as an enlarged material area for receiving blind bores 48. Blind bores 48 are shaped to closely receive the lower ends 50 of a U-shaped torque tool 52 used for firmly screwing the lid 11 onto the housing 10, and for removing the lid as shown in FIG. 2.

A flange 54 is defined around the perimeter of plate 42. Flange 54 bears down on an O-ring 56 seated in a groove 58 on a top surface 60 of the sidewall 12, for sealing the lid to the housing in a water-tight manner.

The axial bores 26 are also sealed by a PVC coupling 62 which is glued to the end of a PVC tube 64 which comprises a water tight conduit for the electrical conductors to and from the fixtures.

The top surface of plate 42 carries concentric ring projections or ridges 70 which produce a non-skid upper surface for the plate. FIG. 1 shows the junction box of the invention flush mounted within a concrete deck 8 of a swimming pool (not shown).

An essential feature of the present invention is the use of a potting compound which substantially fills chamber 14 to thoroughly exclude moisture and to fix and seal the connections between the wires and the ground bar 32 as well as other connections such as those made by one or more screw cap connector 68 in chamber 14.

The potting compound which is shown as crosshatching in chamber 14, must be approved by a recognized testing laboratory (e.g. U.L.). Potting compound of this type are known to the skilled artisan in this field. One potting compound which qualifies is commercially available from the 3M company and is identified by the trademark "SCOTCHCAST #2135". This is an ETL listed potting compound (test report number 496109 ETL Jul. 1990, page 367 CAT #144).

Advantageously, the four machine screws 40 are brass while the self tapping screws 36 are 18—18 stainless steel that is zinc plated.

Torque tool 52 is advantageously made of 1010 steel ⅛ hard rod with a 0.250" diameter.

O-ring 56 is a fluorocarbon-V747-75 material and is sold by Parker Seal Group O-ring Division. A 0.070" diameter O-ring was used for the present invention. The O-ring has fair wet and dry chlorine resistance.

Grounding bar 32 is advantageously cartridge brass (hard condition) made of 70% by weight copper and 30% by weight zinc with a density of 0.308 lb/in$^3$ and a melting temperature of 1680° to 1750° F.

The material of the one piece housing 10 and the one piece lid 11 is polyvinyl chloride, for example, type GEON 87241 supplied by B.F. Goodrich. The plastic is supplied in gray, has a specific gravity of 1.33 g/cm$^3$, a tensile strength of 6,000 psi and a vicat softening temperature of 185° F. This material has been U.L. tested and has a flammability of U.L. 94 V-0 and 5V at 0.062".

The outer diameter of the cylindrical sidewall 12 in the embodiment illustrated is 4.625" with the inside diameter of the chamber 14 being 3.850". The height of the housing from the lower surface of the bottom wall 18 to the upper surface 60 is 2.5" with projections 22, 24 extending an additional 0.75" from the lower surface of the bottom wall 18. The diameter of each projection is 1.25". The plate 42 of lid 11 is 0.25" thick with each torque tool receiving bore 48 being ⅛" deep by 0.313" in diameter. The total height of the lid from the top surface of plate 32 to the bottom surface of rim 44 is 0.925".

While a specific embodiment of the invention has been shown and described in detail to illustrate the application of the principles of the invention, it will be understood that the invention may be embodied otherwise without departing from such principles.

What is claimed is:

1. A junction box adapted for flush mounting and for connecting electrical fixtures of swimming pools and the like, comprising:

a plastic, non-corrosive housing having a side wall defining an interior chamber with an upper opening, a bottom wall connected to the side wall and closing a bottom of the chamber and a pair of spaced apart projections extending downwardly from the bottom wall, each projection having an axial bore therein extending through the bottom wall into the chamber for the passage of conductors into the chamber through the projections;

means defining at least one grounding bar seat in the chamber positioned at an intermediate location between the bottom wall and the upper opening;

an electrically conductive grounding bar connected to the at least one seat for fixing the grounding bar in the chamber;

a plastic, non-corrosive lid detachably connected to the housing at the upper opening; and a water tight seal between the lid and the housing for sealing the upper opening when the lid is engaged to the housing.

2. A junction box according to claim 1, wherein said housing is constructed of a single piece of plastic including the side wall, bottom wall, projections and means defining the at least one grounding bar seat.

3. A junction box according to claim 2, wherein said means defining at least one grounding bar seat comprises a pair of blocks which are diametrically opposed from each other in said chamber, said blocks being connected against an interior surface of the side wall and resting on the bottom wall for defining a pair of spaced apart grounding bar seats across which said grounding bar is engaged.

4. A junction box according to claim 3, wherein each block includes a pair of upwardly projecting ears for engagement on opposite sides of the grounding bar.

5. A junction box according to claim 4, wherein said grounding bar has opposite ends with a hole through each end, each block including a screw receiving hole therein aligned with one hole of said grounding bar for receiving a screw to fix said grounding bar to said blocks.

6. A junction box according to claim 2, including a web made of plastic, non-corrosive material and formed as one piece with said housing, said web extending between and connecting said projections and being engaged with said bottom wall.

7. A junction box according to claim 6, wherein each of said axial bores is threaded for receiving a threaded wire containing connection.

8. A junction box according to claim 7, wherein said lid has an outer thread and said side wall has an inner thread at said upper opening for threadably receiving said lid, said side wall having an upper surface, said water-tight seal comprising an O-ring between said lid and said upper surface of the side wall.

9. A junction box according to claim 8, wherein the upper surface of said side wall includes a groove for receiving the O-ring.

10. A junction box according to claim 7, wherein said lid comprises a disk-shaped plate having an upper surface and a lower surface, an annular rim extending downwardly from the lower surface of said plate and carrying an outer thread and a pair of blind bores in the upper surface of the plate for receiving a torque tool.

11. A junction box according to claim 10, including, in combination, a torque tool for engagement into the bores of the plate.

12. A junction box according to claim 11, including enlargement areas connected at diametrically spaced locations to the rim and at the lower surface of the plate, around the bores for receiving the torque tool.

13. A junction box according to claim 1, including a potting compound substantially filling the chamber.

14. A junction box according to claim 13, including a web extending between the projections and extending downwardly from the bottom wall, the means defining at least one seat comprising a pair of diametrically opposed blocks connected against an inner surface of said side wall and against an upper surface of said bottom wall in said chamber, said grounding bar spanning the space between and engaged on said blocks, said blocks, projections, web, side wall and bottom wall being constructed of a single piece of plastic.

15. A junction box according to claim 14, wherein the grounding bar is made of brass and includes a plurality of threaded holes therein for connection to wires.

16. A junction box according to claim 1, including non-skid means on an upper surface of said lid.

17. A junction box according to claim 16, where said non-skid means comprise concentric ridges.

18. A junction box according to claim 17, wherein said lid comprises a disk-shaped plate having an upper surface and a lower surface, an annular rim extending downwardly from the lower surface of said plate and carrying an outer thread and a pair of blind bores in the upper surface of the plate for receiving a torque tool.

19. A junction box according to claim 18, including, in combination, a torque tool for engagement into the bores of the plate.

20. A junction box according to claim 19, wherein said tool is U-shaped.

* * * * *